(12) United States Patent
Johann

(10) Patent No.: US 7,207,772 B2
(45) Date of Patent: Apr. 24, 2007

(54) COMPRESSOR FOR AN AIRCRAFT ENGINE

(75) Inventor: Erik Johann, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 1 day.

(21) Appl. No.: 10/817,739

(22) Filed: Apr. 5, 2004

(65) Prior Publication Data

US 2005/0214113 A1    Sep. 29, 2005

(30) Foreign Application Priority Data

Mar. 25, 2004    (EP)    ................... 04090120

(51) Int. Cl.
*F04D 21/00* (2006.01)
(52) U.S. Cl. ................... 415/181; 416/236 R; 416/237
(58) Field of Classification Search ................ 415/181, 415/914; 416/235, 236 R, 237, 223 A; 244/130, 244/200
See application file for complete search history.

(56) References Cited

U.S. PATENT DOCUMENTS

| | | |
|---|---|---|
| 1,903,823 A | 12/1928 | Lougheed |
| 3,304,056 A | 2/1967 | Sohma |
| 3,365,126 A | 1/1968 | Stoffer |
| 3,403,893 A | 10/1968 | Stoffer |
| 3,578,264 A | 5/1971 | Kuethe |
| 5,069,403 A * | 12/1991 | Marentic et al. ............ 244/130 |
| 5,169,290 A | 12/1992 | Chou |
| 5,209,644 A | 5/1993 | Dorman |
| 5,313,700 A | 5/1994 | Dorman |
| 5,540,406 A | 7/1996 | Occhipinti |
| 6,183,197 B1 | 2/2001 | Bunker et al. |
| 6,264,429 B1 | 7/2001 | Koeller et al. |
| 6,358,012 B1 | 3/2002 | Staubach |
| 6,416,289 B1 * | 7/2002 | Ramesh et al. ............. 416/235 |
| 6,538,887 B2 | 3/2003 | Belady et al. |
| 6,638,021 B2 | 10/2003 | Olhofer et al. |

FOREIGN PATENT DOCUMENTS

| | | | |
|---|---|---|---|
| DE | 10054244 | | 6/2002 |
| EP | 0937862 | | 8/1999 |
| EP | 0954701 | | 11/1999 |
| EP | 1081332 | | 3/2001 |
| GB | 347138 | | 4/1931 |
| GB | 750305 | | 6/1956 |
| GB | 2032048 A | * | 4/1980 |
| WO | 98/22711 | | 5/1998 |

* cited by examiner

Primary Examiner—Edward K. Look
Assistant Examiner—Dwayne J White
(74) Attorney, Agent, or Firm—Timothy J. Klima

(57) ABSTRACT

On a compressor with compressor blades, a flow transition fixation mechanism (4) is provided on the suction side (2), approximately parallel to the leading edge (3) and upstream of the compression shocks acting upon the blade, which prevents the transition point from the laminar to the turbulent boundary layer flow from oscillating, thus suppressing oscillation of the compression shocks and their coupling effect with the natural frequencies of the compressor blades.

34 Claims, 3 Drawing Sheets

COMPRESSOR FOR AN AIRCRAFT ENGINE

This application claims priority to European Patent Application EP04090120.9 filed Mar. 25, 2004, the entirety of which is incorporated by reference herein.

BACKGROUND OF THE INVENTION

This invention relates to a compressor for an aircraft engine with compressor blades attached to the compressor disk, in particular compressor blades with a small span-chord ratio.

Compressors with compressor blades having a large chord length, but with a reduced number of blades, are known to be used on certain aircraft engines. While this type of compressor has certain advantages over the former designs, this new blade was found to give rise to unexpected stresses in the compressor disk to which it is attached.

BRIEF SUMMARY OF THE INVENTION

It is a broad aspect of the present invention to provide a compressor design which prevents damage or life reduction of the compressor disk and the compressor blades.

It is a particular object of the present invention to provide solution to the above problems by a compressor designed in accordance with the features described herein.

Further advantageous embodiments of the present invention become apparent from the description below.

A mechanism which, according to the present invention, provides surface roughness and is arranged on the suction side of the compressor blades at a certain distance from and essentially parallel to the blade leading edge was unexpectedly found to be capable of reducing the stress on the compressor disk. Comprehensive investigations yielded that unexpectedly strong natural frequencies of the individual blades, i.e. second and third bending mode and first torsional mode, occur under certain flight conditions characterized by flight altitude, flight velocity, Reynolds number and Strouhal number which are transferred via the blade root to the compressor disk and cause damage to the latter. The intent of the arrangement for the fixation of the flow transition on the suction side at a certain distance to the blade leading edge is to prevent, or limit, oscillation of the compression shocks, which are known to act upon the blade surface, and thus to suppress the coupling effect between the oscillating compression shocks and the natural frequencies (second and third bending mode, first torsional mode of the blade) which amplifies the natural frequencies to such an extent that the above-mentioned damage occurs. The inventive concept is to prevent, or limit, the periodic movement of the compression shocks and their reaction on the natural frequencies by fixation of the flow transition, restricting the change-over point from the laminar to the turbulent boundary layer flow upstream of the compression shock, i.e. preventing it from oscillating, locally on the suction side, to such an extent that the oscillating movement of the compression shocks and their vibration-amplifying effect on the natural frequencies of the blades, irrespective of the operating range of the compressor blades, is avoided. Thus, compressors with compressor blades can be made available which will not be damaged by the above-described, specific flight conditions.

In an advantageous form of the present invention, the flow transfer fixation is located in an upper area of the compressor blade extending from the blade tip and consists either of a grainy material bonded to the suction side of the compressor blade or is an integral part of the compressor blade in the form of protrusions or depressions or holes provided on the blade surface. Preferably, the grainy constituents are retained in a binder or applied by spraying, while the protrusions can, for example, have a triangular base and the depressions are provided as semi-circular grooves. The flow transition fixation is provided by at least one row of such protrusions or at least one groove.

The compressor provided with the flow transfer fixation according to the present invention both satisfies all aerodynamic requirements and has long life and essentially unchanged mass. The mechanism described in the above will be located and dimensioned such that the surge characteristics are not affected or that they are even improved. Similarly, the performance data of the blading will not, or only hardly, be affected. In the range of high Reynolds numbers, typically $8.0 \times 10^6$ to $5.0 \times 10^7$, positioning and dimensioning will be such that the behavior of the compressor blade as regards surge and stall is not affected. In the range of small Reynolds numbers, typically $0.5 \times 10^6$ to $8.0 \times 10^6$, positioning and dimensioning will be such that, on the one hand, blade vibration is reduced and, on the other hand, the behavior of the compressor blade as regards surge and stall is not affected.

BRIEF DESCRIPTION OF THE DRAWINGS

The present invention is more fully described in the light of the accompanying drawing showing a preferred embodiment. On the drawing.

DETAILED DESCRIPTION OF THE INVENTION

Figure 1:
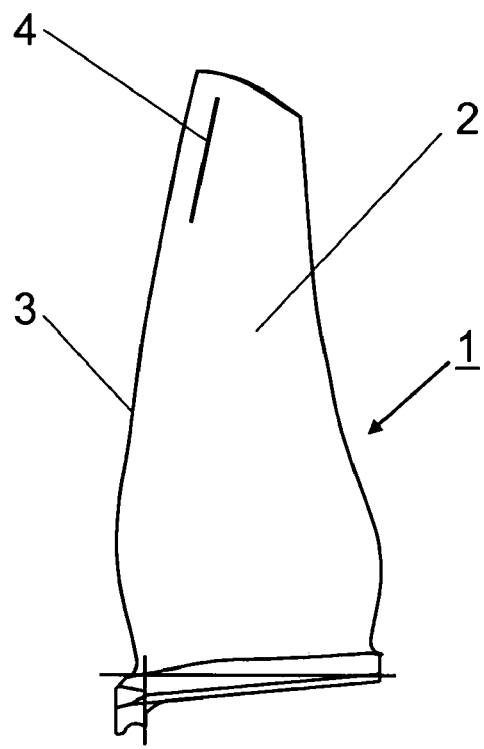
FIG. 1 is a perspective representation of a compressor blade with a mechanism for flow transfer fixation arranged in accordance with the present invention.

FIG. 1 shows a compressor blade 1 at which a long flow transition fixation mechanism 4 is provided on the suction side 2 at a short distance to the leading edge 3. The flow transition fixation mechanism 4 extends approximately parallel to the leading edge 3 in the upper third of the compressor blade 1. Several such compressor blades 1 are attached to the circumference of the compressor disk (not shown).

Figure 2A:
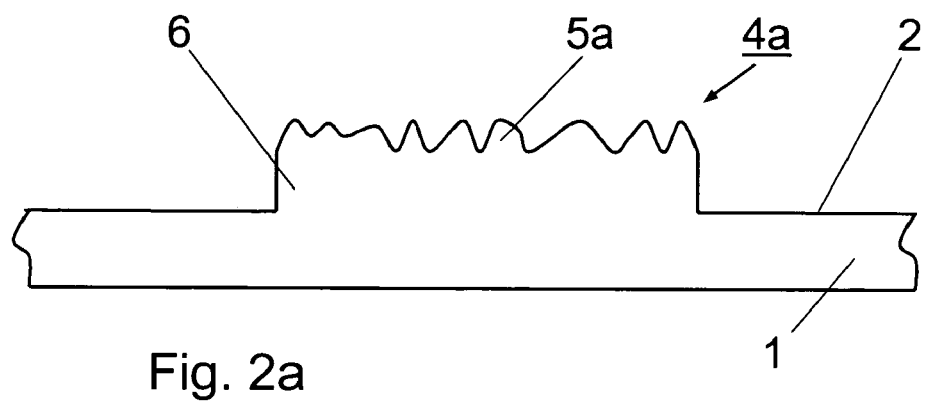
FIG. 2a–f show different design variants of mechanisms for flow transfer fixation, and, FIG. 3 is a graphical representation of the communication between the boundary layer flow and the oscillation of the compression shock at a compressor blade.
Figure 2B:
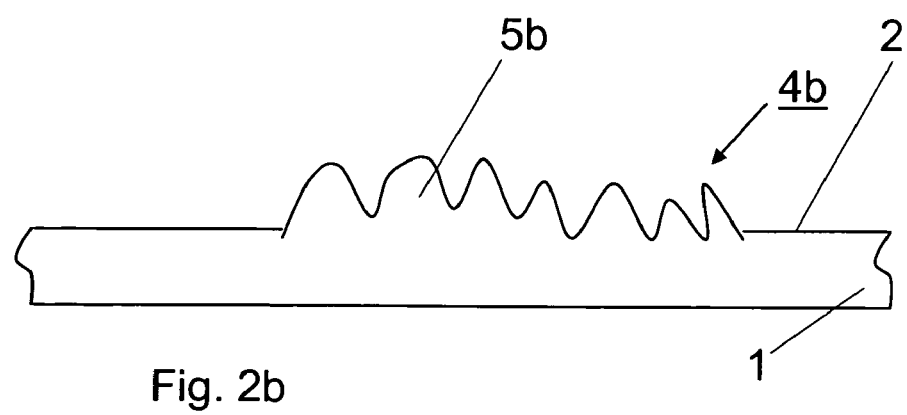
Figure 2C:
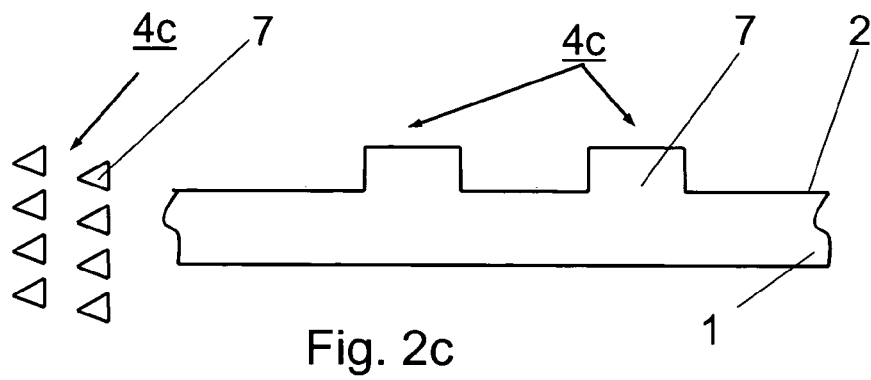
Figure 2D:
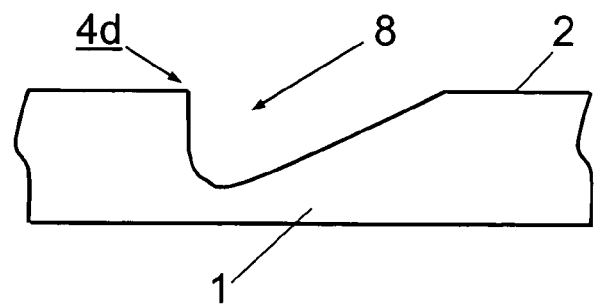
Figure 2E:
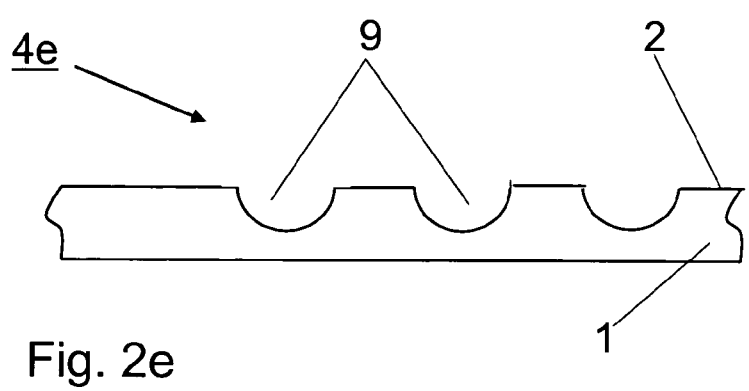
Figure 2F:
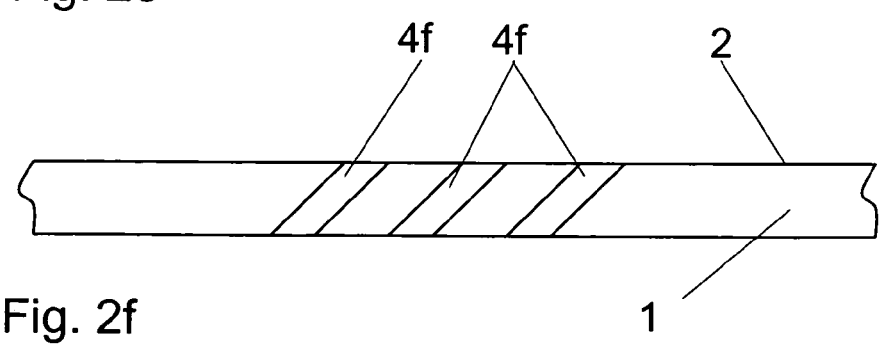

The flow transition fixation mechanism 4 comprises, as shown in FIGS. 2a to 2f, a long area of roughness of varying form provided on the suction side of the compressor blade 1. The drawing shows various examples of the flow transition fixation mechanism 4. The flow transition fixation mechanism 4a shown in FIG. 2a is, on its surface, firmly bonded to a fine-grained material 5a of a certain grain size. A grainy material retained in a binder 6, which must be erosion-resistant, can here be used. In the variant according to FIG. 2b, the flow transition fixation mechanism 4b is made up of an erosion-resistant grainy material 5b with larger grain size which is directly bonded to the surface of the suction side 2. In the third variant shown in FIG. 2c, the flow transfer fixation mechanism 4c consists of two rows of triangular protrusions 7 formed onto the surface of the compressor blade 1 which must be erosion-resistant. Finally, as illustrated in FIGS. 2d and 2e, the flow transition fixation mechanism 4d, 4e can also be formed into the surface of the compressor blade 1 as a groove 8 or several adjacent grooves 9, for example by cold rolling. The width of the above-described variants of the flow transition fixation mechanism 4 preferably ranges between 3 and 15 millimeters, while their height or depth, respectively, can vary between 0.1 and 0.3 millimeters. Other widths/heights and depths can also be used. The fixation of the flow transition can also be achieved very simply by a row of through-holes 4f extending from the suction side to the pressure side, as shown in FIG. 2f.

The operation of the flow transition fixation mechanism 4 arranged and provided on a compressor blade according to the present invention is hereinafter specified in light of FIG. 3. Investigations into compressor disks carrying compressor blades 1 revealed that the unexpected stressing occurs under certain conditions of flight appertaining to Reynolds numbers in the range of $0.5 \times 10^6$ to $8.0 \times 10^6$ and a speed of the compressor blade tip corresponding to 1.1 to 1.5 times the velocity of sound in connection with a speed-related natural frequency of the compressor blade ($1^{st}$ to $3^{rd}$ bending mode and $1^{st}$ torsional mode at the blade tip).

Figure 3:
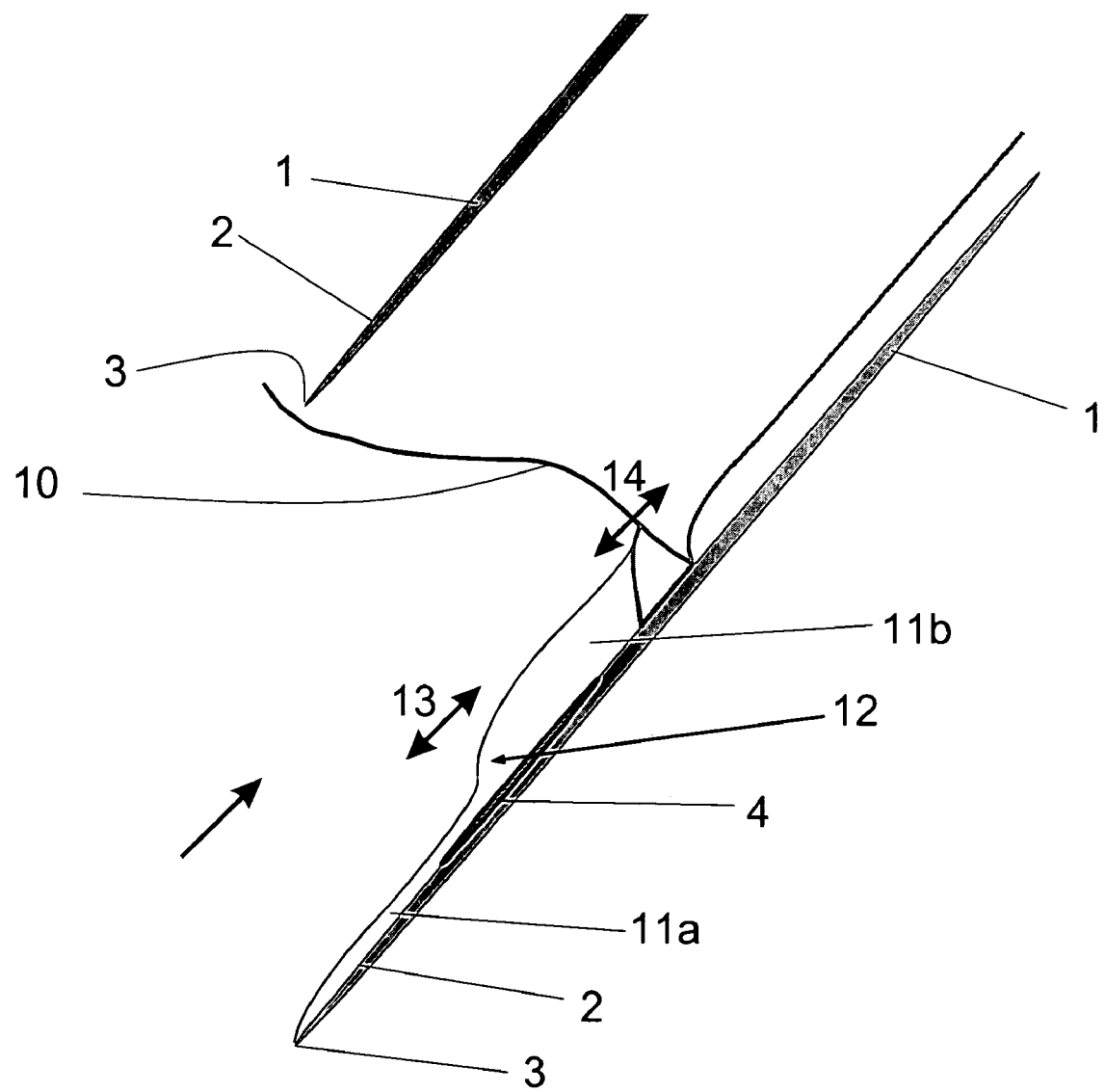

As illustrated in FIG. 3, compression shocks occur on the compressor blade 1 in an area of approx. 45 to 70 percent of the blade width—shown on the drawing in the form of a typical lambda compression shock 10. The high pressure downstream of the compression shock subjects the compressor blade to correspondingly high forces. In addition, a boundary layer flow 11a, 11b communicating with the compression shocks exists at the blade surface which, up to a flow transition point 12, is initially laminar (11a) and subsequently transits into a turbulent flow 11b. Since the flow transition point 12 oscillates periodically, as indicated by arrow 13, the lambda compression shock 10 (case 1) will, as indicated by arrow 14, move between a first and a second position at a frequency corresponding to the periodic shifting of the flow transition point 12. Oscillation of the shock (case 2) may also be caused by a change in the state of the compression shock from a strong one (vertical shock) to a weak one (lambda shock). In both cases, the second and third bending mode and the first torsional mode of the compressor blade 1 are excited by the periodic change in shock and may, due to the coupling effect with the compression shock vibration, load the blade root such that the above-described, unexpected stressing of the compressor disk and blade occurs. By arrangement of the flow transition fixation shown in FIGS. 2 and 3 on the suction side of the compressor blade 1 upstream of the compression shock 10, the flow transition point 12 of the boundary layer flow, and thus the compression shock 10, are, contrary to the oscillating movement shown in FIG. 3, fixed in their position, or limited in their oscillation to such an extent that the vibration-amplifying coupling effect between the natural frequencies of the compressor blade and the compression shock vibrations is suppressed and the natural frequency of compressor blade 1 is prevented from transgressing a certain magnitude.

The flow transition fixation mechanism is preferably dimensioned and positioned such that surge and stall behavior of the compressor blade is not compromised throughout a total specified Reynolds number range from $0.5 \times 10^6$ to $5.0 \times 10^7$.

The present invention can also be used with other blades and/or vanes of a turbine.

LIST OF REFERENCE NUMERALS

1 compressor blade
2 suction side
3 leading edge
4 (4a–4f) flow transition fixation mechanism
5 (5a, 5b) fine-grained/coarse-grained material
6 raised binder
7 triangular protrusions
8 groove with semi-circular cross-section
9 groove with a cross-section that runs out towards the blade surface
10 lambda compression shock
11a laminar boundary layer flow
11b turbulent boundary layer flow
12 flow transition point
13 oscillation of 12
14 oscillation of 10

What is claimed is:

1. An aircraft engine compressor having compressor blades attached to a compressor disk, which compressor blades, under operating conditions, are loaded by natural frequencies and by compression shocks on suction sides thereof at a certain distance from leading edges thereof, with a flow transition fixation mechanism being provided on the suction side of each compressor blade in a portion of the compressor blade located upstream of an area of action of the compression shocks essentially vertical to a boundary layer flow extending at a compressor blade surface which limits oscillation of a flow transition point between an initially laminar end subsequently turbulent boundary layer flow and, thus, oscillation of the compression shocks, and suppresses their reaction on first and second bending modes as well as on a first torsional mode of the compressor blade occurring under certain conditions of flight.

2. A compressor in accordance with claim 1, wherein the flow transition fixation mechanism is provided in a long partial area of the compressor blade extending from the blade tip.

3. A compressor in accordance with claim 2, wherein the flow transition fixation mechanism extends essentially parallel to the leading edge.

4. A compressor in accordance wit claim 3, wherein the flow transition fixation mechanism comprises an elongated area of surface roughness.

5. A compressor in accordance with claim 4, wherein the surface roughness is provided by a fine-grained material which is retained in a raised binder layer.

6. A compressor in accordance with claim 4, wherein the surface roughness is provided by a coarse-grained material which is bonded immediately to the blade surface with a binder.

7. A compressor in accordance with claim 4, wherein the surface roughness for the flow transition fixation mechanism is provided by protrusions made in the blade material end formed onto the surface of the compressor blade.

8. A compressor in accordance with claim 7, wherein the protrusions are triangular in top view.

9. A compressor in accordance with claim 8, wherein at least two rows of triangular protrusions which are offset from each other are provided.

10. A compressor in accordance with claim 4, wherein the surface roughness is provided by at least one groove extending transversely to the boundary layer flow.

11. A compressor in accordance with claim 10, wherein the groove has a semi-circular cross-section.

12. A compressor in accordance with claim 10, wherein the cross-section of the groove gradually tapers towards the blade surface in the direction of flow.

13. A compressor in accordance with claim 4, wherein the surface roughness is provided by holes made in the compressor blade.

14. A compressor in accordance with claim 5, wherein the material providing the surface roughness and the binder used have high erosion resistance.

15. A compressor in accordance with claim 4, wherein the flow transition fixation mechanism is dimensioned and positioned such that surge and stall behavior of the compressor blade is not compromised throughout a total specified Reynolds number range from $0.5 \times 10^6$ to $5.0 \times 10^7$.

16. A compressor in accordance with claim 4, wherein the flow transition fixation mechanism is dimensioned and positioned such that surge and stall behavior of the compressor blade is not compromised throughout a total specified Reynolds number range from $0.5 \times 10^6$ to $8.0 \times 10^6$.

17. A compressor in accordance with claim 4, wherein the width of the flow transition fixation mechanism 4 ranges between 3 and 15 millimeters and the height/depth ranges between 0.1 and 0.3 millimeters.

18. A compressor in accordance wit claim 1, wherein the flow transition fixation mechanism comprises an elongated area of surface roughness.

19. A compressor in accordance with claim 18, wherein the surface roughness is provided by a fine-grained material which is retained in a raised binder layer.

20. A compressor in accordance with claim 18, wherein the surface roughness is provided by a coarse-grained material which is bonded immediately to the blade surface with a binder.

21. A compressor in accordance with claim 18, wherein the surface roughness for the flow transition fixation mechanism is provided by protrusions made in the blade material and formed onto the surface of the compressor blade.

22. A compressor in accordance with claim 21, wherein the protrusions are triangular in top view.

23. A compressor in accordance with claim 22, wherein at least two rows of triangular protrusions which are offset from each other are provided.

24. A compressor in accordance with claim 18, wherein the surface roughness is provided by at least one groove extending transversely to the boundary layer flow.

25. A compressor in accordance with claim 24, wherein the groove has a semi-circular cross-section.

26. A compressor in accordance with claim 24, wherein the cross-section of the groove gradually tapers towards the blade surface in the direction of flow.

27. A compressor in accordance with claim 18, wherein the surface roughness is provided by holes made in the compressor blade.

28. A compressor in accordance with claim 19, wherein the material providing the surface roughness and the binder used have high erosion resistance.

29. A compressor in accordance with claim 18, wherein the flow transition fixation mechanism is dimensioned and positioned such that surge and stall behavior of the compressor blade is not compromised throughout a total specified Reynolds number range from $0.5 \times 10^6$ to $5.0 \times 10^7$.

30. A compressor in accordance with claim 18, wherein the flow transition fixation mechanism is dimensioned and positioned such that surge and stall behavior of the compressor blade is not compromised throughout a total specified Reynolds number range from $0.5 \times 10^6$ to $8.0 \times 10^6$.

31. A compressor in accordance with claim 18, wherein the width of the flow transition fixation mechanism 4 ranges between 3 and 15 millimeters and the height/depth ranges between 0.1 and 0.3 millimeters.

32. A compressor blade for an aircraft engine compressor, which, under operating conditions, is loaded by natural frequencies and by compression shocks on a suction side thereof at a certain distance from a leading edge thereof, with a flow transition fixation mechanism being provided on the suction side in a portion of the compressor blade located upstream of an area of action of the compression shocks essentially vertical to a boundary layer flow extending at a compressor blade surface which limits oscillation of a flow transition point between an initially laminar and subsequently turbulent boundary layer flow and, thus, oscillation of the compression sbocks, and suppresses their reaction on first and second bending modes as well as on a first torsional mode of the compressor blade occurring under certain conditions of flight.

33. A compressor blade for an aircraft engine compressor, comprising a flow transition fixation mechanism on a suction side thereof in a portion of the compressor blade located upstream of an area of action of compression shocks on the compressor blade essentially vertical to a boundary layer flow extending at a compressor blade surface, the flow transition fixation mechanism limiting oscillation of a flow transition point between an initially laminar and subsequently turbulent boundary layer flow and, thus, oscillation of the compression shocks.

34. A compressor blade for a gas torbine, comprising a flow transition fixation mechanism on a suction side thereof in a portion of the compressor blade located upstream of an area of action of compression shocks on the compressor blade essentially vertical to a boundary layer flow extending at a compressor blade surface, the flow transition fixation mechanism limiting oscillation of a flow transition point between an initially laminar and subsequently turbulent boundary layer flow and, thus, oscillation of the compression shocks.

* * * * *